(12) United States Patent
Raju

(10) Patent No.: US 9,378,886 B2
(45) Date of Patent: Jun. 28, 2016

(54) ELECTRONIC POWER TRANSFORMER

(75) Inventor: Ravisekhar Nadimpalli Raju, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 1184 days.

(21) Appl. No.: 13/335,660

(22) Filed: Dec. 22, 2011

(65) Prior Publication Data

US 2013/0162239 A1    Jun. 27, 2013

(51) Int. Cl.
*H01F 29/02* (2006.01)
*H02P 13/06* (2006.01)

(52) U.S. Cl.
CPC ............... *H01F 29/02* (2013.01); *H02P 13/06* (2013.01)

(58) Field of Classification Search
CPC ..... H02M 7/49; H02M 5/271; H02M 5/4585; H02H 7/1216; H01F 29/02
USPC ............... 363/2, 5, 10, 16–17, 40, 64–65, 71, 363/148, 153, 170–171; 323/355–358, 323/361–363
See application file for complete search history.

(56) References Cited

U.S. PATENT DOCUMENTS

| | | | | |
|---|---|---|---|---|
| 3,346,799 A | * | 10/1967 | Aldenhoff | B23K 9/1056 219/130.51 |
| 3,487,289 A | | 12/1969 | McMurray | |
| 5,461,300 A | * | 10/1995 | Kappenman | G05F 5/00 323/215 |
| 5,903,066 A | * | 5/1999 | Enjeti | H02M 1/4216 307/105 |
| 6,151,324 A | | 11/2000 | Belser et al. | |
| 6,154,382 A | | 11/2000 | Kawahara et al. | |
| 6,307,757 B1 | | 10/2001 | Porter et al. | |
| 6,442,047 B1 | | 8/2002 | Cohen | |
| 6,483,205 B1 | | 11/2002 | Martin | |
| 7,994,824 B2 | | 8/2011 | Marino et al. | |
| 8,466,661 B2 | * | 6/2013 | Helle | H02M 1/12 322/100 |
| 2009/0102394 A1 | | 4/2009 | Hausser et al. | |

(Continued)

FOREIGN PATENT DOCUMENTS

KR    100638550 B1    10/2006

OTHER PUBLICATIONS

Bhattacharya et. al, "A Reduced Switch Transformer-Less Dual Hybrid Active Power Filter", Industrial Electronics, 2009. IECON '09. 35th Annual Conference of IEEE, pp. 88-93, ISSN : 1553-572X, Issue date: Nov. 3-5, 2009.

(Continued)

*Primary Examiner* — Adolf Berhane
*Assistant Examiner* — Henry Lee, III
(74) *Attorney, Agent, or Firm* — Pabrita K. Chakrabarti

(57) ABSTRACT

A multi-phase electronic power transformer includes a set of primary windings, wherein each primary winding is configured to couple with an input voltage. The transformer includes a pair of primary switching devices that includes a first primary switching device coupled to a first end of each primary winding and a second primary switching device coupled to a second end of each primary winding distinct from the first end of each primary winding. The transformer includes a set of secondary windings, wherein each secondary winding is configured to inductively couple with a respective primary winding and to output a voltage. The transformer includes a pair of secondary switching devices that includes a first secondary switching device coupled to a first end of each secondary winding and a second secondary switching device coupled to a second end of each secondary winding distinct from the first end of the each secondary winding.

25 Claims, 2 Drawing Sheets

(56) References Cited

U.S. PATENT DOCUMENTS

2010/0014325 A1    1/2010   Raju et al.
2010/0102786 A1    4/2010   Appel et al.
2010/0327793 A1*  12/2010   Komulainen ......... H02M 5/225
                                                         318/503
2011/0007534 A1    1/2011   Gupta et al.

OTHER PUBLICATIONS

Castelino, Gysler, et al.; "Power Electronic Transformer with Reduced Number of Switches: Analysis of Clamp Circuit for Leakage Energy Commutation", Power Electronics, Drive and Energy Systems (PEDES) & 2010 Power India, 2010 Joint International Conference, Dec. 20-23, 2010; 8 pages.

* cited by examiner

ELECTRONIC POWER TRANSFORMER

STATEMENT REGARDING FEDERALLY SPONSORED RESEARCH & DEVELOPMENT

This invention was made with Government support under contract number N00014-07-C-0415 awarded by the Office of Naval Research (ONR). The Government has certain rights in the invention.

BACKGROUND

Many modern power systems require large and heavy conventional transformers. The weight and volume of these transformers is a barrier to the development of expanded electrical capabilities associated with certain power system applications. This is especially relevant with the 50 Hz and 60 Hz transformers used for many utility distribution systems as well as the electrical distribution systems associated with ships, planes, and railroads. The size of the present transformers impacts the placement criteria that can be problematic in space-restricted areas. The weight of the transformers not only impacts logistics, but also impacts the operational efficiency if the heavy transformers are carried onboard.

BRIEF DESCRIPTION

In a first embodiment, a system is provided that includes a multi-phase electronic power transformer. The multi-phase electronic power transformer includes a set of primary windings, wherein each primary winding is configured to couple with an input voltage. The multi-phase electronic power transformer also includes a pair of primary switching devices that include a first primary switching device coupled to a first end of each primary winding and a second primary switching device coupled to a second end of each primary winding distinct from the first end of each primary winding. The multi-phase electronic power transformer further includes a set of secondary windings, wherein each secondary winding is configured to inductively couple with a respective primary winding and to output a voltage. The multi-phase electronic power transformer yet further includes a pair of secondary switching devices that includes a first secondary switching device coupled to a first end of each secondary winding and a second secondary switching device coupled to a second end of each secondary winding distinct from the first end of the each secondary winding. The primary switching devices and the secondary switching devices are configured to operate synchronously to output one or more voltages at an output frequency equal to an input frequency of one or more input voltages.

In a second embodiment, a system is provided that includes a multi-phase, high frequency electronic power transformer. The high frequency electronic power transformer includes a set of primary windings, wherein each primary winding is configured to couple with an input voltage. The high frequency electronic power transformer also includes a pair of primary switching devices that include a first primary switching device coupled to a first end of each primary winding and a second primary switching device coupled to a second end of each primary winding distinct from the first end of each primary winding. The high frequency electronic power transformer further includes a set of secondary windings, wherein each secondary winding is configured to inductively couple with a respective primary winding and to output a voltage. The high frequency electronic power transformer yet further includes a pair of secondary switching devices that includes a first secondary switching device coupled to a first end of each secondary winding and a second secondary switching device coupled to a second end of each secondary winding distinct from the first end of the each secondary winding. Each primary and secondary switching device includes one or more electronic switches. A total of the respective electronic switches for each primary and secondary switching device is less than a total of the respective primary and second windings coupled to each respective primary and secondary switching device.

In a third embodiment, a system is provided that includes a multi-phase electronic power transformer. The multi-phase electronic power transformer includes a set of primary windings, wherein each primary winding is configured to couple with an input voltage. The multi-phase electronic power transformer also includes a pair of primary switching devices that include a first primary switching device coupled to a first end of each primary winding and a second primary switching device coupled to a second end of each primary winding distinct from the first end of each primary winding. The multi-phase electronic power transformer further includes a set of secondary windings, wherein each secondary winding is configured to inductively couple with a respective primary winding and to output a voltage. The multi-phase electronic power transformer yet further includes a pair of secondary switching devices that includes a first secondary switching device coupled to a first end of each secondary winding and a second secondary switching device coupled to a second end of each secondary winding distinct from the first end of the each secondary winding. Each primary and secondary switching device includes a multi-phase diode bridge, each multi-phase diode bridge includes a plurality of phase-leg modules, each phase-leg module is coupled to a pair of electronic switches, and each electronic switch is coupled to a single controller.

BRIEF DESCRIPTION OF THE DRAWINGS

These and other features and aspects of the present embodiments will become better understood when the following detailed description is read with reference to the accompanying drawings in which like characters represent like parts throughout the drawings, wherein.

DETAILED DESCRIPTION

In the subsequent paragraphs, various embodiments of power conversion systems with a solid-state or electronic power transformer having fewer switching devices will be explained in detail. The various aspects of the present embodiments will be explained, by way of example only, with the aid of figures hereinafter. The present embodiments for power conversion systems will generally be described by reference to an exemplary power conversion system designated by numeral 10. The embodiments of the electronic power transformers described herein may be utilized in the integrated power system architecture aboard ships, planes, and trains, in wind energy applications, in offshore/subsea applications (e.g., offshore oil and gas platforms and subsea oilfields), in utility distribution networks, or in mobile units (e.g., military or transport).

Figure 1:
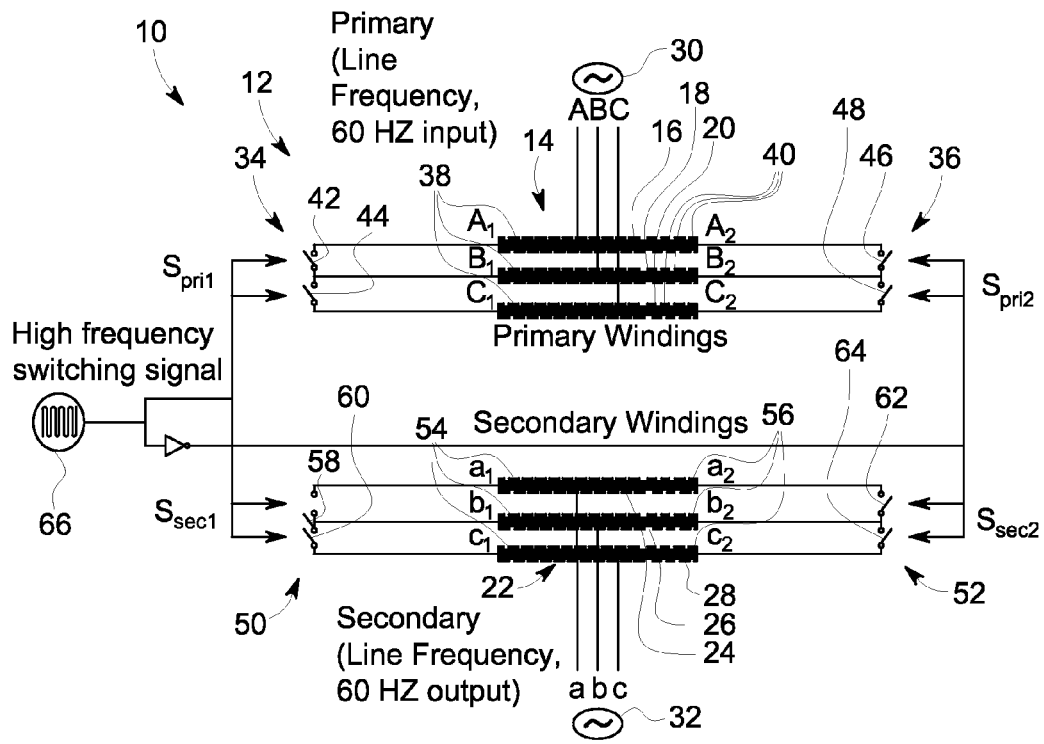
FIG. 1 is a diagrammatic view of an exemplary electronic power transformer with a reduced number of switches in accordance with certain embodiments of the disclosure.
Figure 2:
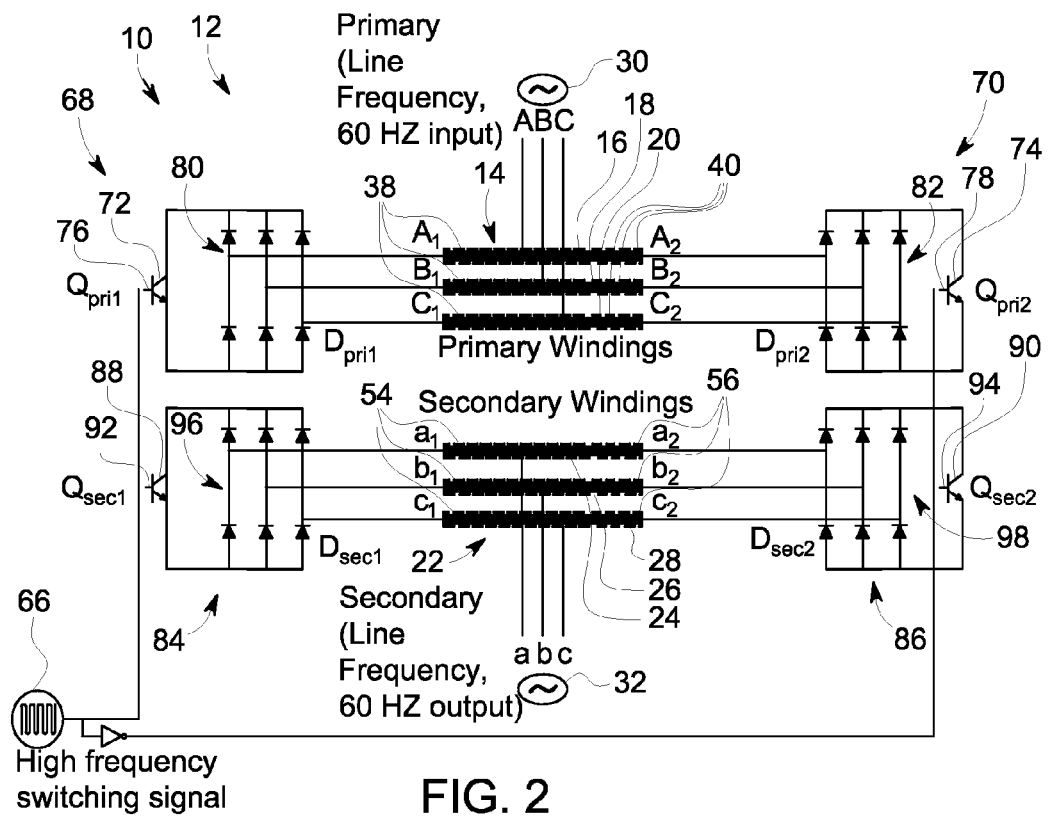
FIG. 2 is a diagrammatic view of an exemplary electronic power transformer that includes switching devices with electronic switches that include transistors and multi-phase diode bridges in accordance with certain embodiments of the disclosure.
Figure 3:
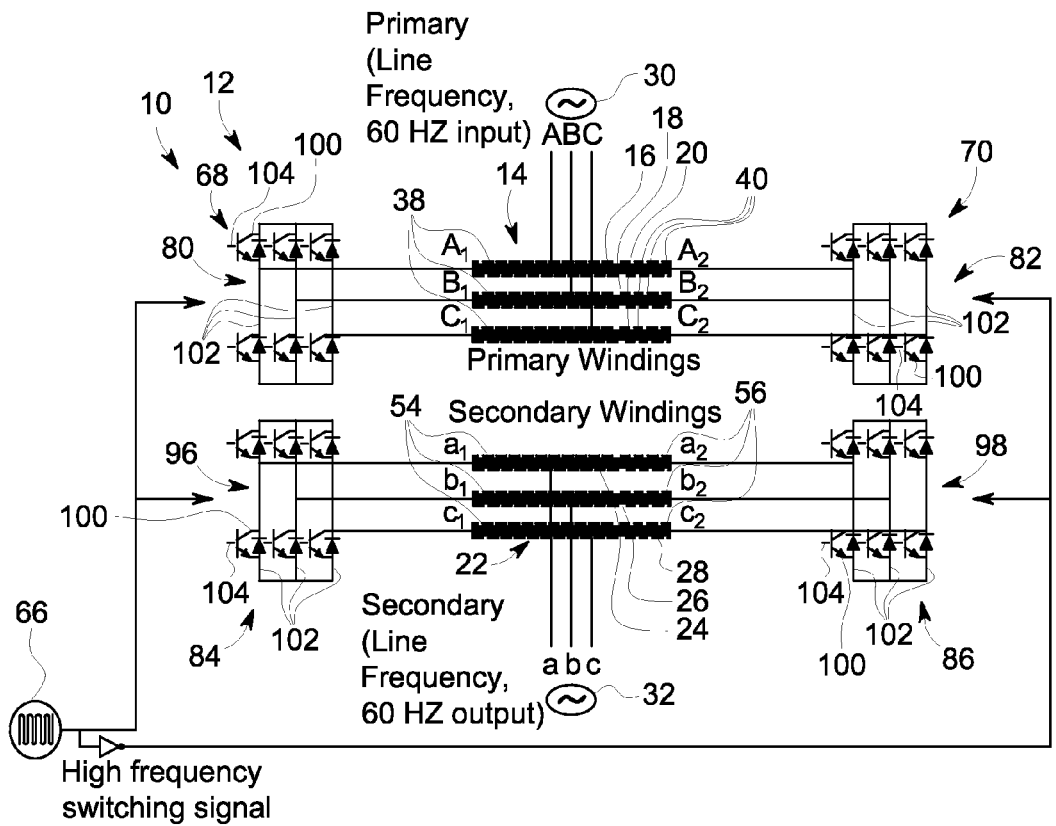
FIG. 3 is a diagrammatic view of an exemplary electronic power transformer that includes switching devices with multi-phase diode bridges and electronic switches coupled to each phase-leg module of the multi-phase diode bridges in accordance with certain embodiments of the present disclosure.

The power conversion system 10 depicted in FIGS. 1-3 includes a solid-state or electronic power transformer 12. In certain embodiments, the electronic power transformer 12 includes a high frequency transformer. The weight and size of the transformer 12 is determined by its frequency. As described in greater detail below, the electronic power transformer 12 includes fewer switching devices operating at a higher frequency (e.g., approximately 10 kHz to 100 kHz) than in conventional line-frequency transformers enabling a reduction in size and weight of the transformer 12. In addition, the transformer 12 operates with a higher efficiency (e.g., part-load efficiency) than conventional line-frequency transformers.

As depicted in FIG. 1, the electronic power transformer 12 includes a multi-phase (e.g., three-phase) power transformer. The transformer 12 includes a set of primary windings or coils or conductors 14 inductively coupled to a set of secondary winding or coils or conductors 22, respectively, and configured to transfer electrical energy from one circuit to another. The number of primary and secondary windings 14, 22 may vary. As illustrated, the set of primary windings 14 includes three primary windings 16, 18, 20 and the set of secondary windings 22 includes three secondary windings 24, 26, 28. Each winding 14, 22 includes two sections. For example, primary winding 16 includes sections $A_1$ and $A_2$, primary winding 18 includes sections $B_1$ and $B_2$, primary winding 20 includes sections $C_1$ and $C_2$, secondary winding 24 includes sections $a_1$ and $a_2$, secondary winding 26 includes sections $b_1$ and $b_2$, and secondary winding 28 includes sections $c_1$ and $c_2$. The primary windings 14 are coupled to an AC source 30. As depicted, the AC source 30 provides multi-phase (e.g., three-phase) voltage input signals. In certain embodiments, the frequency of the input voltages may range from approximately 40-100 Hz. For example, the frequency of the input voltages may be approximately 40 Hz, 50 Hz, 60 Hz, 70 Hz, 80 Hz, 90 Hz, 100 Hz, or any other frequency. As depicted, the frequency of the input voltage 30 is 60 Hz. The center taps of the primary windings 14 are coupled (e.g., electrically) to the AC source 30 via lines A, B, and C, where each line provides an input voltage at a different phase. Each secondary winding 22 is coupled to an AC load 32 and configured to output a voltage. In particular, each secondary winding 22 recreates a frequency for the output voltage equal to the input voltage (e.g., 60 Hz). The center taps of the secondary windings 22 are coupled to the AC load 32 via lines a, b, and c.

The transformer 12 also includes a pair of primary switching devices 34 ($S_{pri1}$) and 36 ($S_{pri2}$). The primary switching device 34 is coupled to ends 38 of sections $A_1$, $B_1$, $C_1$ of the primary windings 16, 18, 20. The primary switching device 36 is coupled to ends 40 of sections $A_2$, $B_2$, $C_2$ of the primary windings 16, 18, 20. As illustrated, the ends 38, 40 are distinct from each other and disposed on opposite ends of the primary windings 14. Each primary switching device 34, 36 includes a pair of switches (e.g., electronic or semiconductor switches). In certain embodiments, each switch may include a single controller. As described in greater detail below, each switch may include a transistor. As illustrated, the primary switching device 34 includes switches 42, 44, and the primary switching device 36 includes switches 46, 48. The total of the switches (e.g., 2) for each primary switching device 34, 36 is less than total of the respective primary windings 14 (e.g., 3) coupled to each primary switching device 34, 36.

The transformer 12 also includes a pair of secondary switching devices 50 ($S_{sec1}$) and 52 ($S_{sec2}$). The secondary switching device 50 is coupled to ends 54 of sections $a_1$, $b_1$, $c_1$ of the secondary windings 24, 26, 28. The secondary switching device 52 is coupled to ends 56 of sections $a_2$, $b_2$, $c_2$ of the secondary windings 24, 26, 28. As illustrated, the ends 54, 56 are distinct from each other and disposed on opposite ends of the secondary windings 22. Each secondary switching device 50, 52 includes a pair of switches (e.g., electronic or semiconductor switches). In certain embodiments, each switch may include a single controller. As described in greater detail below, each switch may include a transistor. As illustrated, the secondary switching device 50 includes switches 58, 60, and the secondary switching device 52 includes switches 62, 64. The total of the switches (e.g., 2) for each secondary switching device 50, 52 is less than total of the respective secondary windings 22 (e.g., 3) coupled to each secondary switching device 50, 52.

Each of the switching devices 34, 36, 50, 52 receives high frequency switching signals synchronized from a common source 66 to control the opening and closing of the switches of the switching devices 34, 36, 50, 52 to generate high frequency voltages and magnetic flux within the transformer core. The multi-phase input voltages are applied across the primary windings 16, 18, 20 via the lines A, B, C in a rapidly alternating polarity using the primary switching devices 34, 36. For example, when the voltages are applied, the switches 42, 44 of the switching device 34 are closed (i.e., on) and the switches 46, 48 of the switching device 36 are open (i.e., off) to generate a winding voltage with a certain polarity across each section $A_1$, $B_1$, $C_1$ of the primary windings 14. To switch the polarity of the winding voltage, the switches 46, 48 of the switching device 36 are closed and the switches 42, 44 of the switching device 34 are open to reverse the polarity for the winding voltage across each section $A_2$, $B_2$, and $C_2$ of the primary windings 14. The switches of the switching devices 34, 36 are configured to operate at a frequency substantially higher than the multi-phase input voltages. The frequency of the switches of the switching devices 34, 36 may range from approximately 10 kHz (e.g., high power) to 100 kHz (e.g., low power) depending on the power level of the transformer 12.

The switches of the secondary switching devices 50 52 are configured to operate in synchronization with the switches of the primary switching devices 34, 36 to output voltages at an output frequency equal to the input frequency of the input voltages. For example, the switches 42, 44 of the switching device 34 and the switches 58, 60 of the switching device 50 may be closed, while the switches 46 and 48 of the switching device 36 and the switches 62, 64 of the switching device 52 may be open. Conversely, the switches 42, 44 of the switching device 34 and the switches 58, 60 of the switching device 50 may be open, while the switches 46, 48 of the switching device 36 and the switches 62, 64 of the switching device 52 may be closed. Similar to the switches of the switching devices 34 and 36, the switches of the switching devices 50, 52 are configured to operate at a frequency substantially higher than the multi-phase input voltages. The frequency of the switches of the switching devices 50, 52 may range from approximately 10 kHz (e.g., high power) to 100 kHz (e.g., low power) depending on the power level of the transformer 12. The operation of these switches at a high frequency enables a significant size and weight reduction in the transformer 12 compared to a conventional line-frequency transformer, which reduces the cost of the transformer 12. In addition, the configuration of the core of the transformer 12 enables the transformer 12 to operate at a higher efficiency (e.g., part-load efficiency). The reduced number of switches compared to prior art on electronic transformers can lower the cost and improve reliability.

As depicted in FIG. 2, the electronic power transformer 12 includes a multi-phase (e.g., three-phase) power transformer that includes switching devices with electronic switches that include transistors and multi-phase (e.g., three-phase) diode bridges. The transformer 12 includes a set of primary windings 14 and secondary windings 22 coupled to the AC source 30 and AC load 32 as described above in FIG. 1. The transformer 12 also includes a pair of primary switching devices 68 ($Q_{pri1}$) and 70 ($Q_{pri2}$). The primary switching device 68 is coupled to the ends 38 of the sections $A_1$, $B_1$, $C_1$ of the primary windings 16, 18, 20. The primary switching device 70 is coupled to the ends 40 of the sections $A_2$, $B_2$, $C_2$ of the primary windings 16, 18, 20. As illustrated, the ends 38, 40 are distinct from each other and disposed on opposite ends of the primary windings 14. As illustrated, each switching device 68, 70 includes a single switch (e.g., 72, 74, respectively), such as an electronic or semiconductor switch, with a single controller (e.g., 76, 78, respectively). In certain embodiments, each switch 72, 74 includes a device such as an insulated gate bipolar transistor. As illustrated, each switching device 68, 70 includes a multi-phase (e.g., three-phase) diode bridge (e.g., 80, 82, respectively). In the depicted embodiment, the phase-leg modules of each of the diode bridges 80, 82 are not individually controlled and thus, the voltages across each primary winding 14 are not individually controlled. Instead, the phase-leg modules of each diode bridge 80, 82 are controlled as a single unit by the respective switch 72, 74 coupled to the diode bridge 80, 82. The diode bridges 80, 82 are conductive upon the closing of their respective switches 72, 74.

The total of the switches (e.g., 1) for each primary switching device 68, 70 is less than total of the respective primary windings 14 (e.g., 3) coupled to each primary switching device 68, 70. As illustrated, the ratio of primary windings 14 coupled to each primary switching device 68, 70 to switches in each respective primary switching device 68, 70 is 3 (3:1). In certain embodiments, this ratio may range from approximately 0.5 to 10 depending on the total number of switches associated with each primary switching device 68, 70 and the total number of primary windings 14 coupled to the switching devices 68, 70.

The transformer 12 also includes a pair of secondary switching devices 84 ($Q_{sec1}$) and 86 ($Q_{sec2}$). The secondary switching device 84 is coupled to the ends 54 of the sections $a_1$, $b_1$, $c_1$ of the secondary windings 24, 26, 28. The secondary switching device 86 is coupled to the ends 56 of the sections $a_2$, $b_2$, $c_2$ of the secondary windings 24, 26, 28. As illustrated, the ends 54, 56 are distinct from each other and disposed on opposite ends of the secondary windings 22. As illustrated, each switching device 84, 86 includes a single switch (e.g., 88, 90, respectively), such as an electronic or semiconductor switch, with a single controller (e.g., 92, 94, respectively). In certain embodiments, each switch 88 and 90 includes a device such as an insulated gate bipolar transistor. As illustrated, each switching device 84, 86 includes a multi-phase (e.g., three-phase) diode bridge (e.g., 96, 98, respectively). In the depicted embodiment, the diode bridges 96, 98 are not individually controlled and thus, the voltages across each secondary winding 22 are not individually controlled. Instead, the phase-leg modules of each diode bridge 96, 98 are controlled as a single unit by the respective switch 88, 90 coupled to the diode bridge 80, 82 The diode bridges 96, 98 are conductive upon the closing of their respective switches 88, 90.

The total of the switches (e.g., 1) for each secondary switching device 84, 86 is less than the total of the respective secondary windings 22 (e.g., 3) coupled to each secondary switching device 84, 86. As illustrated, the ratio of the secondary windings 22 coupled to each secondary switching device 84, 86 to the switches in each secondary switching device 84, 86 is 3 (3:2). In certain embodiments, this ratio may range from approximately 0.5 to 10 depending on the total number of switches associated with each secondary switching device 84, 86 and the total number of secondary windings 22 coupled to the switching devices 84, 86.

Each of the controllers 76, 78, 92, 94 of the switching devices 68, 70, 84, 86 (i.e., switches 72, 74, 88, 90) receive high frequency switching signals from a common source 66 to control the opening and closing of the switches 72, 74, 88, 90 of the switching devices 68, 70, 84, and 86 to generate high frequency voltages and magnetic flux within the transformer core. The multi-phase input voltages are applied across the primary windings 16, 18, 20 via the lines A, B, C in a rapidly alternating polarity using the primary switching devices 68, 70. For example, when the voltages are applied, the switch 72 of the switching device 68 is closed (i.e., on) and the switch 74 of the switching device 70 is open (i.e., off) to generate a winding voltage with a certain polarity across each section $A_1$, $B_1$, $C_1$, of the primary windings 14. To switch the polarity of the winding voltage, the switch 74 of the switching device 70 is closed and the switch 72 of the switching device 68 is opened to reverse the polarity for the winding voltage across each section $A_2$, $B_2$, $C_2$ of the primary windings 14. The switches 72, 74 of the switching devices 68, 70 are configured to operate at a frequency substantially higher than the multi-phase input voltages. The frequency of the switches 72, 74 of the switching devices 68, 70 may range from approximately 10 kHz (e.g., high power) to 100 kHz (e.g., low power) depending on the power level of the transformer 12.

The switches 88, 90 of the secondary switching devices 84, 86 are configured to operate in synchronization with the switches 72, 74 of the primary switching devices 68, 70 to output voltages at an output frequency equal to the input frequency of the input voltages. For example, the switches 72, 88 of the respective switching devices 68, 84 may be closed, while the switches 74, 90 of the switching devices 70, 86 may be open. Conversely, the switches 72, 88 of the switching devices 68, 84 may be open, while the switches 74, 90 of the switching devices 70, 86 may be closed. Similar to the switches 72, 74 of the switching devices 68, 70, the switches 88, 90 of the switching devices 84, 86 are configured to operate at a frequency substantially higher than the multi-phase input voltages. The frequency of the switches of the switching devices 72, 74, 92 and 94 may range from approximately 10 kHz (e.g., high power) to 100 kHz (e.g., low power) depending on the power level of the transformer 12. The reduced number of switches in the transformer 12 (compared to a conventional transformer) and the operation of these switches at a high frequency enables a significant size and weight reduction in the transformer 12 compared to a conventional line-frequency transformer, which reduces the cost of the transformer 12. In addition, the configuration of the core of the transformer 12 enables the transformer 12 to operate with a higher efficiency (e.g., part-load efficiency).

As depicted in FIG. 3, the electronic power transformer 12 includes a multi-phase (e.g., three-phase) power transformer 12 having switching devices 68, 70, 84, 86 with semi-conductor or electronic switches 100 coupled to each phase-leg 102 of each multi-phase (e.g., three-phase) diode bridges 80, 82, 96, 98. The transformer 12 in FIG. 3 is as described in FIG. 2 except each phase-leg module 102 of each multi-phase diode bridge 80, 82, 96, 98 is coupled to electronic switches 100 to enable independent control of each phase of the voltages across the windings 14, 22. The independent control enables one or more phases of the voltages to be utilized by the transformer 12 even if one of the other lines associated with the other phases of voltages is defective or not needed. The independent control also enables each phase voltage to be regulated separately and allows flexible timing of switching instants with low voltage and current stresses. As illustrated each phase-leg module 102 of each multi-phase diode bridge 80, 82, 96, 98 includes a pair of electronic switches 100. In certain embodiments, the electronic switch 100 may include a transistor. Each electronic switch 100 is coupled to a single controller 104.

A controller 66 provides high frequency switching signals to control the opening and closing of the switches 100 of the switching devices 68, 70, 84, and 86 to generate high voltage frequencies within the transformer core. The multi-phase input voltages are applied across the primary windings 16, 18, 20 via the lines A, B, C in a rapidly alternating polarity using the primary switching devices 68, 70. For example, when the voltages are applied, the switches 100 of one or more phase-leg modules 102 of the multi-phase diode bridge 80 are closed (i.e., on) and the switches 100 of the corresponding one or more phase-leg modules 102 (i.e., for the same line (e.g., A, B, C)) of the multi-phase diode bridge 82 are open (i.e., off) to generate a winding voltage with a certain polarity across the respective section (e.g., $A_1, B_1, C_1$) of the primary windings 14. To switch the polarity of the winding voltage, the switches 100 of one or more phase-leg modules 102 of the multi-phase diode bridge 82 are closed and the switches 100 of the corresponding one or more phase-leg modules 102 of the multi-phase diode bridge 80 are open to generate a reverse polarity for the winding voltage across each respective section (e.g., $A_2, B_2, C_2$) of the primary windings 14. In certain embodiments, the switches 100 for only some of the phase-leg modules 102 of each individual primary switching device 68, 70 may be closed, while the remaining switches of the other phase-leg modules 102 of the device 68, 70 may be open. The switches 100 of the switching devices 68, 70 are configured to operate at a frequency substantially higher than the multi-phase input voltages. The frequency of the switches 100 of the switching devices 68, 70 may range from approximately 10 kHz (e.g., high power) to 100 kHz (e.g., low power) depending on the power level of the transformer 12.

The switches 100 of the secondary switching devices 84, 86 are configured to operate in synchronization with the switches 100 of the primary switching devices 68, 70 to output voltages at an output frequency equal to the input frequency of the input voltages. For example, the corresponding switches 100 (i.e., for inductively coupled lines (e.g., A and a, B and b, C and c)) of one or more phase-leg modules 102 of the multi-phase diode bridges 80, 96 may be closed, while the switches 100 of the corresponding one or more phase-leg modules 102 (i.e., for the same line) of the multi-phase diode bridges 82, 98 may be open. Conversely, the corresponding switches 100 (i.e., for inductively coupled lines (e.g., A and a, B and b, C and c)) of one or more phase-leg modules 102 of the multi-phase diode bridges 80, 96 may be open, while the switches 100 of the corresponding one or more phase-leg modules 102 (i.e., for the same line) of the multi-phase diode bridges 82, 98 may be closed. In certain embodiments, the switches 100 for only some of the phase-leg modules 102 of each individual multi-phase diode bridge 96, 98 may be closed, while the remaining switches 100 of the other phase-leg modules 102 of the diode bridge 96, 98 may be open.

Similar to the switches 100 of the switching devices 68, 70, the switches 100 of the switching devices 84, 86 are configured to operate at a frequency substantially higher than the multi-phase input voltages. The frequency of the switches 100 of the switching devices 84, 86 may range from approximately 10 kHz (e.g., high power) to 100 kHz (e.g., low power) depending on the power level of the transformer 12. The reduced number of switches 100 in the transformer 12 (compared to a conventional transformer) and the operation of these switches 100 at a high frequency enables a significant size and weight reduction in the transformer 12 compared to a conventional line-frequency transformer, which reduces the cost of the transformer 12. In addition, the configuration of the core of the transformer 12 enables the transformer 12 to operate with a higher efficiency (e.g., part-load efficiency).

Figure 4:
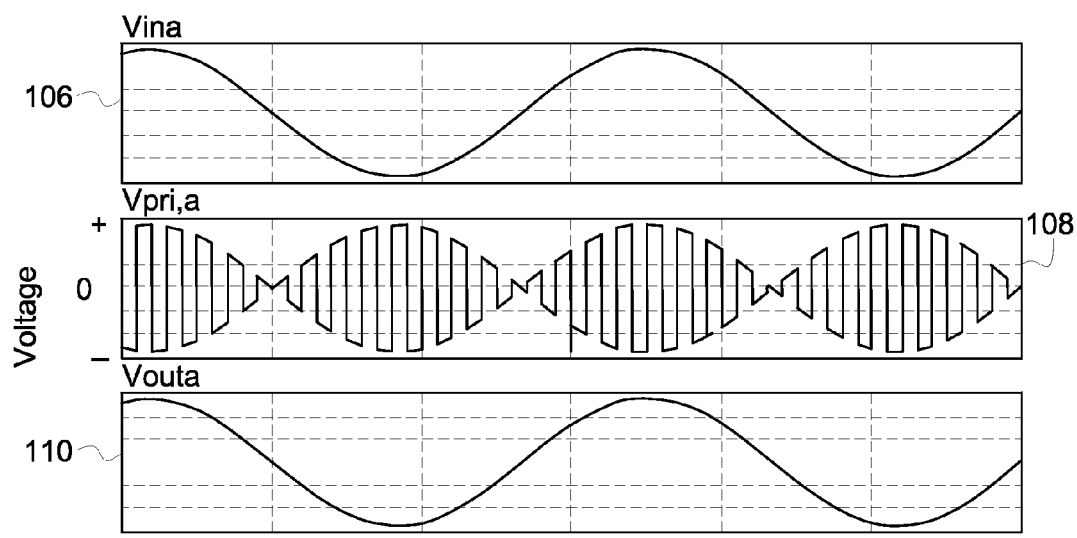
FIG. 4 illustrates signal waveforms for the electronic power transformer of FIGS. 1-3 in accordance with certain embodiments of the disclosure.

As mentioned above, the primary and secondary switching devices of the transformer 12 are configured to operate synchronously to recreate output voltages at an output frequency substantially equal to the input frequencies of the input voltages. FIG. 4 illustrates the signal waveforms for a single phase utilizing the embodiments of the transformer 12 described in FIGS. 1-3. Graph 106 illustrates the frequency of the input voltage for a single phase. Graph 108 illustrates the winding voltage (e.g., high frequency winding voltage) across the primary winding 22 for the single phase. Graph 110 illustrates the frequency of the output voltage for the single phase. Graphs 106 and 108 illustrate that the frequency for the input voltage of the single phase is substantially equal to the frequency of the output voltage recreated by the transformer 12 for the single phase. Graph 108 illustrates the rapidly alternating polarity (e.g., between positive and negative polarities) at a high frequency in the winding voltage across the primary winding 22 for the single phase.

Technical effects of the disclosed embodiments are to provide a more efficient power conversion system 10. In particular, the power conversion systems 10 include the electronic power transformer 12 (e.g., high frequency transformer) with fewer switches relative to a conventional line-frequency transformer. The switches of the transformer 12 operate at a frequency (e.g., 10 kHz to 100 kHz) substantially higher than the input frequency of the input voltages. The fewer switches operating at high frequency enables a significant size and weight reduction in the transformer 12 compared to electronic transformers in prior art, while also reducing the costs of the transformer. In addition, the transformer 12 operates at a higher efficiency (e.g., part-load efficiency).

This written description uses examples, including the best mode, to enable any person skilled in the art to practice the disclosed embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
   a multi-phase electronic power transformer, comprising:
   a set of center tapped primary windings, wherein each primary winding is configured to directly couple with an input voltage at a respective primary winding center tap;
   a pair of primary switching devices comprising a first primary switching device coupled to a first end of each primary winding and a second primary switching device coupled to a second end of each primary winding, wherein the first end and the second end of each primary winding are distinct and disposed on opposite sides of the respective primary winding center taps;
   a set of center tapped secondary windings, wherein each secondary winding is configured to inductively couple with a respective primary winding and to directly output a voltage at a respective secondary winding center tap; and
   a pair of secondary switching devices comprising a first secondary switching device coupled to a first end of each secondary winding and a second secondary switching device coupled to a second end of each secondary winding, wherein the first end and the second end of each secondary winding are distinct and disposed on opposite sides of the respective secondary winding center taps, wherein the pair of primary switching devices are configured to operate synchronously with the pair of secondary switching devices to output one or more voltages at an output frequency equal to an input frequency of one or more input voltages; and the multi-phase electronic power transformer configured by the inductively coupled set of center tapped primary and secondary windings to directly convert the one or more input voltages and the input frequency to output the one or more output voltages and output frequency at the set of center tapped secondary windings.

2. The system of claim 1, wherein the pair of primary switching devices comprises one or more electronic switches, and a total of the respective electronic switches for the pair of primary switching devices is less than a total of the respective primary windings coupled to the pair of primary switching devices.

3. The system of claim 1, wherein the pair of secondary switching devices comprises one or more electronic switches, and a total of the respective electronic switches for the pair of secondary switching devices is less than a total of the respective secondary windings coupled to the pair of secondary switching devices.

4. The system of claim 1, wherein each of: the first primary switching device, the second primary switching device, the first secondary switching device, and the second secondary switching device comprises one or more electronic switches, and a total of the respective electronic switches for each of: the first primary switching device, the second primary switching device, the first secondary switching device, and the second secondary switching device is less than a total of the respective primary and secondary windings coupled to each respective primary and secondary switching device.

5. The system of claim 1, wherein each of: the first primary switching device, the second primary switching device, the first secondary switching device, and the second secondary switching device comprises a pair of electronic switches.

6. The system of claim 1, wherein each of: the first primary switching device, the second primary switching device, the first secondary switching device, and the second secondary switching device comprises a single controller.

7. The system of claim 6, wherein each of: the first primary switching device, the second primary switching device, the first secondary switching device, and the second secondary switching device comprises a single electronic switch coupled to a respective controller.

8. The system of claim 7, wherein each of: the first primary switching device, the second primary switching device, the first secondary switching device, and the second secondary switching device comprises a transistor.

9. The system of claim 8, wherein each of: the first primary switching device, the second primary switching device, the first secondary switching device, and the second secondary switching device comprises a multi-phase diode bridge coupled to a respective electronic switch.

10. The system of claim 1, wherein the pair of primary and the pair of secondary switching devices are configured to enable independent control of one or more voltages across the pair of primary and the pair of secondary windings.

11. The system of claim 10, wherein each of: the first primary switching device, the second primary switching device, the first secondary switching device, and the second secondary switching device comprises a multi-phase diode bridge, each multi-phase diode bridge comprises a plurality of phase-leg modules, each phase-leg module is coupled to a pair of electronic switches and each electronic switch is coupled to a single controller.

12. The system of claim 1, wherein the set of primary windings comprises three primary windings and the set of secondary windings comprises three secondary windings.

13. The system of claim 1, wherein each of: the first primary switching device, the second primary switching device, the first secondary switching device, and the second secondary switching device comprises one or more electronic switches, and each electronic switch is configured to operate at a frequency higher than a frequency of the one or more input voltages.

14. The system of claim 1, wherein the multi-phase electronic power transformer comprises a high frequency transformer.

15. A system, comprising:
   a multi-phase, high frequency electronic power transformer, comprising:
   a set of center tapped primary windings, wherein each primary winding is configured to directly couple with an input voltage at a respective primary winding center tap;
   a pair of primary switching devices comprising a first primary switching device coupled to a first end of each primary winding and a second primary switching device coupled to a second end of each primary winding, wherein the first end and the second end of each primary winding are distinct and disposed on opposite sides of the respective primary winding center taps;
   a set of center tapped secondary windings, wherein each secondary winding is configured to inductively couple with a respective primary winding and to directly output a voltage at a respective secondary winding center tap; and
   a pair of secondary switching devices comprising a first secondary switching device coupled to a first end of each secondary winding and a second secondary switching device coupled to a second end of each secondary winding, wherein the first end and the second end of each secondary winding are distinct and disposed on opposite sides of the respective secondary winding center taps, wherein each of: the first primary switching device, the second primary switching device, the first secondary switching device, and the second secondary switching device comprises one or more electronic switches, and a total of the respective electronic switches of: the first primary switching device, the second primary switching device, the first secondary switching device, and the second secondary switching device is less than a total of the respective primary and secondary windings coupled to each respective primary and secondary switching device; and the multi-phase electronic power transformer configured by the inductively coupled set of center tapped primary and secondary windings to directly convert the one or more input voltages and the input frequency to output the one or more output voltages and output frequency at the set of center tapped secondary windings.

16. The system of claim 15, wherein each of: the first primary switching device, the second primary switching device, the first secondary switching device, and the second secondary switching device comprises a pair of electronic switches.

17. The system of claim 15, wherein each of: the first primary switching device, the second primary switching device, the first secondary switching device, and the second secondary switching device comprises a single controller.

18. The system of claim 17, wherein each of: the first primary switching device, the second primary switching device, the first secondary switching device, and the second secondary switching device comprises a single electronic switch coupled to a respective controller.

19. The system of claim 18, wherein each of: the first primary switching device, the second primary switching device, the first secondary switching device, and the second secondary switching device comprises a transistor.

20. The system of claim 19, wherein each of: the first primary switching device, the second primary switching device, the first secondary switching device, and the second secondary switching device comprises a multi-phase diode bridge coupled to a respective electronic switch.

21. A system, comprising:
a multi-phase electronic power transformer, comprising:
a set of center tapped primary windings, wherein each primary winding is configured to directly couple with an input voltage at a respective primary winding center tap;
a pair of primary switching devices comprising a first primary switching device coupled to a first end of each primary winding and a second primary switching device coupled to a second end of each primary winding, wherein the first end and the second end of each primary winding are distinct and disposed on opposite sides of the respective primary winding center tap;
a set of center tapped secondary windings, wherein each secondary winding is configured to inductively couple with a respective primary winding and to directly output a voltage at a respective secondary winding center tap; and
a pair of secondary switching devices comprising a first secondary switching device coupled to a first end of each secondary winding and a second secondary switching device coupled to a second end of each secondary winding, wherein the first end and the second end of each secondary winding are distinct and disposed on opposite sides of the respective secondary winding center taps, wherein each of: the first primary switching device, the second primary switching device, the first secondary switching device, and the second secondary switching device comprises a multi-phase diode bridge, each multi-phase diode bridge comprises a plurality of phase-leg modules, each phase-leg module is coupled to a pair of electronic switches, and each electronic switch is coupled to a single controller; and the multi-phase electronic power transformer configured by the inductively coupled set of center tapped primary and secondary windings to directly convert the one or more input voltages and the input frequency to output the one or more output voltages and output frequency at the set of center tapped secondary windings.

22. The system of claim 21, wherein the first primary switching device, the second primary switching device, the first secondary switching device, and the second secondary switching device are configured to enable independent control of one or more voltages across the primary and secondary windings.

23. The system of claim 21, wherein the set of primary windings comprises three primary windings and the set of secondary windings comprises three secondary windings.

24. The system of claim 21, wherein the multi-phase electronic power transformer comprises a high frequency transformer.

25. The system of claim 21, wherein each electronic switch is configured to operate at a frequency higher than a frequency of one or more input voltages.

* * * * *